United States Patent Office 3,235,547
Patented Feb. 15, 1966

3,235,547
NOVEL OXAZOLINE COMPOUNDS AND METHOD OF PREPARATION
Isidore Pollack, Westminster, and Frederick S. Kaveggia, Los Angeles, Calif., assignors to Purex Corporation, Ltd., Lakewood, Calif., a corporation of California
No Drawing. Filed July 3, 1962, Ser. No. 207,416
10 Claims. (Cl. 260—240)

This invention relates to a novel group of compounds, and is particularly concerned with a novel group of compounds containing the oxazol ring, many of which have fluorescent properties, and to a method of preparation of these compounds.

Fluorescent dyes and chemicals are now widely used in many arts. Thus, for example, fluorescent dyes are employed as textile dyes and are also used in inks, paints, pigments, dye penetrants for inspection of the surface of objects, to detect cracks and flaws therein, and for coloring of metals. For some applications the fluorescent dyes are required to be water soluble, while for others the dyes must be substantially insoluble in water and soluble in organic solvents. The most valuable types of fluorescent dyes are those which exhibit a bright fluorescence within the visible spectrum when excited by light of the proper wave length, e.g., ultraviolet or so-called "black light."

It is accordingly an object of the invention to provide a novel class of compounds, many of which possess fluorescent characteristics.

Another object is the provision of a class of compounds having a plurality of functional hydroxy groups, capable of further reaction, e.g., to form polymeric materials.

A particular object of the invention is the provision of a group of novel compounds characterized by the presence therein of an oxazole ring, or substituted oxazole ring, and exhibiting bright fluorescence.

Still another object is to afford novel fluorescent dyes, certain of which are soluble in organic solvents while others are essentially water soluble, and having a bright yellow to blue fluorescent emission within the visible spectrum.

Yet another object is the provision of procedure for producing the compounds of the invention.

Other objects and advantages will appear hereinafter.

We have unexpectedly found that by reacting at relatively high temperature and alkanol secondary amine, and wherein the hydroxy and secondary amino groups are attached to adjacent carbon atoms, with a tricarboxylated compound of the group consisting of citric acid, aconitic acid, tricarballylic acid, and esters thereof, a cyclization reaction, and usually also an amidation reaction, occur, involving the carboxylic acid groups or the ester groups of the tricarboxylated compound, and the secondary amino and hydroxy groups of the alkanolamine, to form an oxazole-type linkage, and usually also an amido linkage, between the alkanolamine and the tricarboxylated compound, splitting off water, or both water and an alcohol, in the reaction, and resulting in a novel and valuable class of compounds, many of which are soluble in organic solvents, and certain of which particularly exhibit bright yellow to blue fluorescence when excited by ultraviolet light.

From presently available data, and as will be pointed out more fully below, it is also believed that two molecules of the tricarboxylated compound are linked together by one molecule of alkanol secondary amine through formation of an amide linkage and an ester linkage.

The compounds produced according to the invention are basically 2,3-substituted 1,3-oxazoles of the general type represented by the formula:

(I)
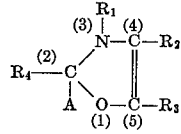

wherein A is a member of the group consisting of a decarboxylated citric acid radical, a decarboxylated aconitic acid radical, a decarboxylated tricarballylic acid radical, and the corresponding decarboxylated ester radicals, e.g., a decarboxylated citric acid ester radical, a decarboxylated aconitic acid ester radical, or a decarboxylated tricarballylic acid ester radical, and from which at least one carboxylic group has been removed; $R_1$ is an alkyl radical, e.g., containing from 1 to about 22, preferably about 1 to about 12, carbon atoms, such as methyl, ethyl, propyl, isopropyl, butyl, amyl, octyl, nonyl, decyl, undecyl, duodecyl, and the like, and including cycloalkyl, e.g., cyclopentyl, cyclohexyl, and the like; an aryl radical, either monocyclic or polycyclic, such as phenyl, naphthyl, and the like; or alkaryl or aralkyl, such as methyl phenyl or ethyl phenyl, tolyl, phenyl ethyl, and the like; and wherein said alkyl, aryl, alkaryl and aralkyl radicals can be further substituted, e.g., by sulfonic acid groups, hydroxy groups, and the like, $R_2$, $R_3$ and $R_4$ are each hydrogen, or an alkyl, aryl, alkaryl or aralkyl radical, substituted or unsubstituted, as described above, and wherein $R_2$, $R_3$ and $R_4$ may be the same or different.

As will be pointed out more fully below, it is believed that usually only one of the carboxylic groups in each molecule of the tricarboxylated compound, that is, citric, aconitic or tricarballylic acid, or the esters thereof, reacts with the alkanol secondary amine to form the above-noted oxazole-type ring, so that under these conditions only one of the three carboxylic groups of the above tricarboxylated compound is replaced by such ring.

As previously noted, amidation of at least one of the other two carboxylic groups of the above tricarboxylated compound also takes place in the reaction, to produce a structure having the general formula:

(II)
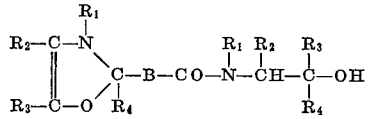

where B is a member of the group consisting of a decarboxylated citric acid radical, a decarboxylated aconitic acid radical, a decarboxylated tricarballylic acid radical, and the corresponding decarboxylated ester radicals, and from which at least two carboxylic groups have been removed; and $R_1$, $R_2$, $R_3$, and $R_4$ have the values above noted.

As previously indicated, it is further believed from experimental and analytical data that two molecules of the tricarboxylated compound, citric acid, tricarballylic acid, aconitic acid, or their esters, are linked together by an alkanol secondary amine residue through an amide and an ester linkage, as a result of reaction of the secondary amino group of one molecule of the alkanolamine with one carboxylic group on the first molecule of the tricarboxylated compound, and reaction of the hydroxyl group of such alkanolamine molecule with a carboxylic group on the second molecule of the tricarboxylated compound. The resulting reaction product is thus believed to have the following general formula:

(III) 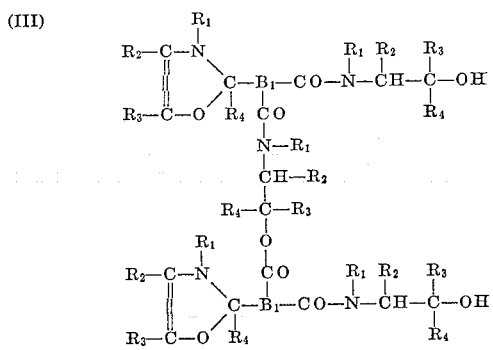

wherein $B_1$ is a member of the group consisting of a decarboxylated citric acid radical, a decarboxylated aconitic acid radical, and a decarboxylated tricarballylic acid radical, from which all three carboxyl groups have been removed, and $R_1$, $R_2$, $R_3$, and $R_4$ have the values above defined.

The most desirable compounds are those wherein $R_2$, $R_3$ and $R_4$ in Formula III above are all hydrogen.

The preferred compounds of the invention, accordingly, are oxazole-amide-esters of citric acid, aconitic acid, tricarballylic acid, or the esters thereof.

The following are some specific examples of novel compounds, according to the invention:

(a) 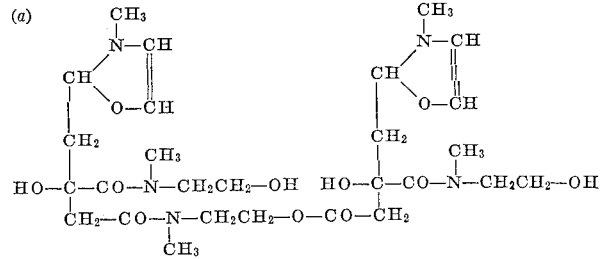

(b) 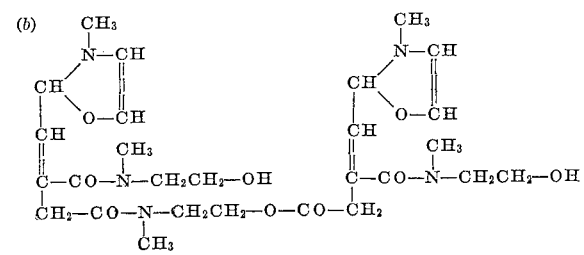

(c) 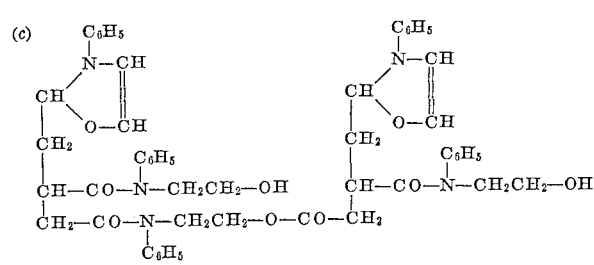

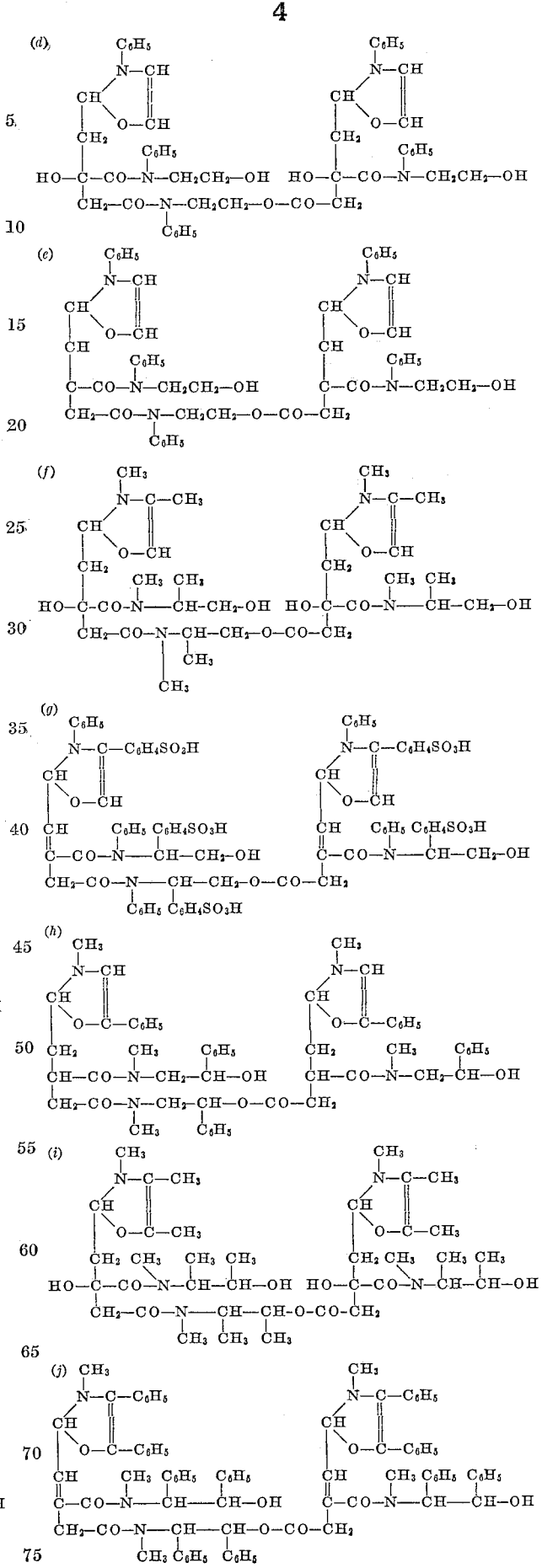

(k) 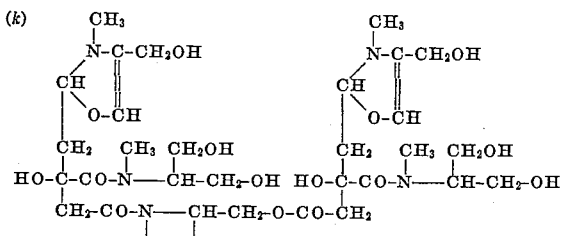

(l) 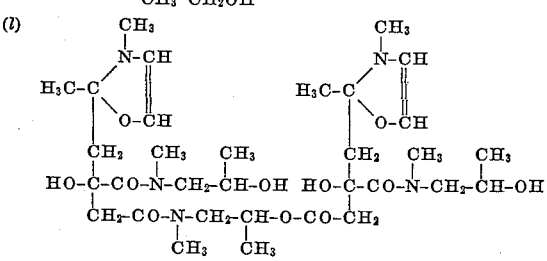

(m) 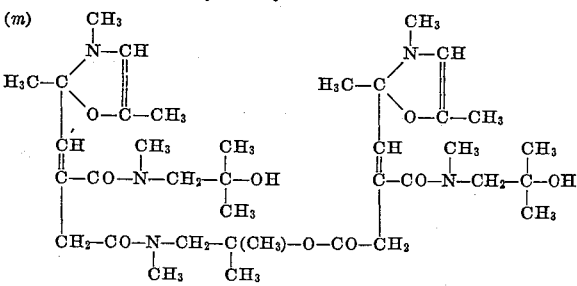

The compound structures represented by Formulae I, II, III, and IV, and (a) to (m) above, for the products produced by the reaction of an alkanol secondary amine and citric acid, aconitic acid, or tricarballylic acid or their esters, according to the invention, have been established and confirmed by laboratory analysis, including molecular weight determinations, and infrared and ultraviolet absorption spectra of the products.

Alkanol secondary amines which can be reacted with the above tricarboxylated compound for producing the compounds hereof have the general formula:

(IV)      $\underset{R_4}{HN-CH-C-OH}$ with $R_1, R_2, R_3$ where $R_1$, $R_2$, $R_3$, and $R_4$ have the values above defined.

Examples of alkanol secondary amines which can be employed in the reaction with citric, aconitic or tricarballylic acid, or their esters, to produce the reaction products or novel compounds of the invention are the following:

$CH_3-NH-CH_2CH_2-OH$ $C_2H_5-NH-CH_2CH_2-OH$ $C_6H_5-NH-CH_2CH_2-OH$ $CH_3-NH-\underset{CH_3}{CH}-CH_2-OH$ $C_6H_5-NH-\underset{\text{}}{CH}-CH_2-OH$

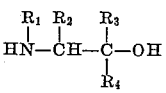

$\underset{SO_3H}{}$ $CH_3-NH-\underset{CH_2-C_6H_5}{CH}-CH_2-OH$ $CH_3-NH-CH_2-\underset{CH_3}{CH}-OH$ $CH_3-NH-CH_2-\underset{C_6H_5}{CH}-OH$

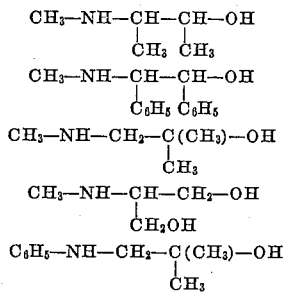

$CH_3-NH-\underset{C_6H_5}{CH}-\underset{C_6H_5}{CH}-OH$ $CH_3-NH-CH_2-\underset{CH_3}{C(CH_3)}-OH$ $CH_3-NH-\underset{CH_2OH}{CH}-CH_2-OH$ $C_6H_5-NH-CH_2-\underset{CH_3}{C(CH_3)}-OH$ As the tricarboxylated reactant, the tricarboxylic acids, citric acid, aconitic acid, tricarballylic acid, or their substituted derivatives, are suitable. Substituted citric, aconitic or tricarballylic acids which can be employed may be, for example, the alkyl, e.g., methyl, ethyl, propyl, and the like derivatives, and the aryl e.g., phenyl and naphthyl, derivatives of citric acid, aconitic acid, and tricarballylic acid.

The esters, e.g., the alkyl esters, of citric acid, of aconitic acid, of tricarballylic acid, or their substituted derivatives, may also be employed. These are generally in the form of triesters, although mixed acid-esters may be employed such as the diesters of citric, aconitic and tricarballylic acids. Thus, for example, triethyl citrate, triethyl aconitate, or triethyl carballylate can be employed, and diethyl citrate, diethyl aconitate and diethyl carballylate may also be suitable. The corresponding methyl, propyl and butyl esters can also be used. Substituted citric, aconitic, or tricarballylic acid esters which may be employed include the alkyl, e.g., methyl, ethyl, propyl, and the like, derivatives, and the aryl, e.g., phenyl and naphthyl derivatives, of citric acid ester, aconitic acid ester, or tricarballylic acid ester.

The terms "a citric acid," "a citric acid ester," "an aconitic acid," "an aconitic acid ester," "a tricarballylic acid," and "a tricarballylic acid ester," as employed herein, are intended to denote either the unsubstituted or the substituted acids and esters. The preferred tricarboxylated compounds are the unsubstituted citric acid, aconitic acid, and tricarballylic acid, and their unsubstituted triesters.

The reaction between the amine and the tricarboxylated compound can be carried out by forming a mixture of the amine and the tricarboxylic acid or ester in the desired molar proportions, as described more fully below. The mixture is then stirred while low heat is applied over a period of, say, 15 to 20 minutes, to form a melt. When a completely homogeneous melt is obtained, the application of heat is increased and the melt is rapidly heated to temperature in the range of about 300° to about 400° F, usually about 320° to about 390° F., until frothing occurs. The reaction mixture is further heated and maintained at temperatures in the above ranges for a period, e.g., about 10 to 20 minutes, until frothing ceases, indicating completion of the reaction. Water, or both water and alcohol, are formed as a result of amidation, cyclization or ring formation, and esterification, which can take place in the reaction.

When the reaction is completed, the reaction product is purified and separated from the reaction mixture by extracting the reaction mixture, preferably with a solvent for the excess amine and in which the reaction product is insoluble, e.g., isopropyl alcohol or benzene, thus forming a solvent solution containing the excess amine, and removing such solvent solution, e.g., by decantation, from the reaction mixture. The alcohol insoluble portion, containing water and residual organic solvent, is then heated to evaporate water and remaining solvent, and the residue comprising reaction product is then dried.

As an alternative of the above purification procedure, a solvent can be used in which the reaction product is soluble and in which the excess amine is insoluble, thus extracting a solvent solution of the product, and removing the solvent by distillation to recover the product.

Alternatively, the above-described solvent extractions can be omitted, and instead the reaction mixture can be subjected to vacuum distillation to drive off the amine, water, and alcohol, if present, followed by drying the reaction product residue.

The reaction products of the invention may be soluble in water in some instances and soluble in organic solvents in other instances. Generally, where the substituent attached to the nitrogen of the amine reactant is an aromatic radical, e.g., phenyl, or a relatively long chain alkyl radical, e.g., containing about 4 or more carbon atoms, the resulting compound is generally soluble in organic solvents such as alcohols, e.g., butanol, in ketones such as acetone, in esters such as ethyl acetate, and in aromatic hydrocarbons such as benzene and toluene. Where the substituent attached to the nitrogen of the amine is a short chain alkyl radical of say about 1 to 3 carbon atoms, the resulting compounds are usually soluble in water.

Many of the invention compounds, particularly those compounds formed from a citric acid, an aconitic acid, or their esters, emit fluorescent light in the visible region of the spectrum when either the solid product or a solution thereof is subjected to an activating or exciting wave length of light, usually in the invisible portion of the spectrum, by irradiation with "black light" or ultraviolet light. The fluorescent emission of the products in solid form may be different than the fluorescent emission of the same product in solution, that is, a different color fluorescence may be obtained under these two conditions.

The compounds of the invention are produced employing a molar proportion of at least 1 mol of alkanolamine per mol of the tricarboxylated compound. The preferred products, having the general Formula III above, are prepared by employing in the condensation reaction at least 6, and usually between 6 and 8, mols of the alkanolamine, e.g. methyl ethanolamine, per 2 mols of a citric acid, an aconitic acid, or a tricarballylic acid, or their respective esters (i.e., at least a 3:1 molar ratio of alkanolamine to such tricarboxylated compounds). Molar proportions of alkanolamine greater than 8 mols, e.g., up to 14 mols, per 2 mols of a citric acid, an aconitic acid, or a tricarballylic acid compound, or their esters, can be employed to produce preferred compounds having the structure of Formula III above, except that care must be taken to remove as much of the excess amine as possible from the reaction mixture, as the presence of such excess amine in the product tends to weaken the brightness of the fluorescent emission from the product or solutions thereof.

However, although only 5 mols of the alkanolamine react with each 2 mols of a citric acid, an aconitic acid, or a tricarballylic acid, or their respective esters to form the compound of Formula III, it has been found that at least one mol of the alkanolamine in excess of such stoichiometric amount of 5 mols, for each 2 mols of the above tricarboxylated compounds, is required, in order to produce a product of the structure of Formula III and represented by the specific Compound $a$ to $m$ above. It is not known what the function of such excess amine is in the reaction, that is, whether it acts as a catalyst or in some other manner to facilitate formation of the reaction product.

Although preferred compounds are prepared by reacting the alkanolamine and a citric acid, an aconitric acid, or a tricarballylic acid, or their esters, in a molar proportion of from 3 to 4 mols of the alkanolamine per mol of the acid or ester, useful compounds can be prepared employing a molar proportion of less than 3, e.g., from 1 to about 2.5 mols of alkanolamine per mol of the acid or ester. Employing the above less preferred lower molar proportions of alkanolamine to tricarboxylated compound, it is believed that products are formed which, although not having the preferred structure illustrated in Formula III, have the typical oxazole ring structure linked to a decarboxylated citric, aconitic, or tricarballylic acid radical, or their respective ester radicals, according to the general Formula I above, and which may also have an amide linkage, as illustrated by general Formula II above, if sufficient alkanolamine is employed to form both types of linkages. These reaction products are also contemplated within the purview of the invention.

The fluorescent compounds or fluorescent dyes produced according to the invention may be used to color cotton or nylon. Thus, for example, such compounds, e.g., Compound $h$ above, can be sulfonated, e.g., on the aromatic nucleus or a sulfonated reaction product can be formed from a sulfonated aromatic reactant, such as a sulfonated aryl-substituted alkanolamine, e.g., Compound $g$ above. The provision of a sulfonated reaction product may render the dye substantive to cotton. In weakly acid baths, e.g., aqueous acetic or boric acid solutions, the fluorescent dyes of the invention are substantive to and can be exhausted on nylon and Acrilan.

Further, the fluorescent dyes of the invention can be employed in formulations useful for leak detection, in dye penetrants for detection of flaws in surfaces of bodies, in paints, and the like.

Certain of the compounds of the invention, e.g., those produce by reaction of the alkanolamines defined above with a tricarballylic acid, or their esters, may not possess fluorescent properties. However, since these compounds, as well as those previously noted which are fluorescent, contain a plurality, e.g., two or more, free hydroxy groups (see Formula III above), these compounds can serve as intermediates for further reaction or coupling with other compounds, to produce useful polymers or dyes. For example, the compounds of the invention may be reacted with a dicarboxylic acid, e.g., succinic or adipic acid, to produce polymeric compounds in the form of plastics, films, or fibers.

The following are examples of preparation of the compounds or dyes of the invention, and their application.

*Example 1*

38 grams (0.2 mol) of citric acid were intimately mixed with 83 grams (0.6 mol) of phenyl ethanolamine. The mixture was heated slowly to 325° F. until a melt was obtained, and then more rapidly at 390° F. until frothing ceased. After the reaction was completed, the product was vacuum distilled to remove excess amine. The resulting product, Compound $d$ above, was insoluble in water but very soluble in organic solvents such as benzene, to which it gave a bright blue fluorescence when the solution was subjected to "black light." The solid compound emitted a greenish yellow fluorescence when irradiated by "black light."

*Example 2*

17.4 grams of aconitic acid were reacted with 41.1 grams of phenylethanolamine (1:3 mole ratio), by slow addition of the amine to the aconitic acid. The reaction mixture was slowly heated to about 350° F. until frothing ceased. The product obtained may be purified by solvent extraction, e.g., with isopropyl alcohol, to remove excess amine, or by vacuum distillation. The reaction product, Compound $e$ above, was solvent soluble. A small amount (0.1%) in xylene showed blue fluorescence under "black light." The dry solid product emitted a green fluorescence under "black light."

*Example 3*

17.4 grams of aconitic acid were reacted with 22.5 grams of methylethanolamine by slowly adding the amine to the acid (1:3 mole ratio). The reaction mixture was heated to 350° F. until frothing ceased. The product obtained may be purified by solvent extraction with isopropyl alcohol, to remove excess amine, or by vacuum distillation. The product obtained, Compound $b$ above, was water soluble. A small amount (0.1% or less) gave strong blue fluorescence under "black light."

Example 4

The procedure of Example 3 is repeated, employing, in place of aconitic acid, the same molar quantity of citric acid. A product, Compound a, is obtained, having fluorescent properties similar to Compound b of Example 3.

Example 5

The procedure of Example 1 is repeated, employing in place of phenyl ethanolamine each of the following alkanolamines in the same molar proportion of about 3 mols of the alkanolamine per mol of citric acid as in Example 1, and carrying out the reaction at temperature ranging from about 350° F. to about 375° F.:

1-(methylamino), 1-methyl ethanol-2
1-(phenylamino), 1-(benzene sulfonic acid)ethanol-2
1-(methylamino), 2-methyl ethanol-2
1-(methylamino), 1,2-diphenyl ethanol 2.

Reaction products having the structure of Formula III above are thereby obtainable.

Example 6

The procedure of Example 1 is repeated, employing a molar proportion of about 3.5 mols of phenyl ethanolamine per mol of citric acid, at reaction temperatures of about 350° F. to about 375° F.

Example 7

The procedure of Example 1 is repeated, except employing a mol ratio of 2 mols phenyl ethanolamine per mol of citric acid.

Example 8

The procedure of Example 1 is repeated employing triethyl citrate in place of citric acid, using a proportion of about 3 mols of phenyl ethanolamine to 1 mol of triethyl citrate, to obtain the same fluorescent product, Compound d as in Example 1.

Example 9

The procedure of Example 8 is repeated employing, in place of the triethyl citrate, the triethyl ester of aconitic acid, to obtain Compound e above, having strong fluorescent characteristics.

Example 10

The procedure of Example 1 is repeated, employing tricarballylic acid instead of citric acid. The product thereby obtainable is represented by Formula c above.

Example 11

The fluorescent dye of Formula b above is employed for coloring nylon by first forming a treating bath having the following composition:

|  | Percent by weight |
|---|---|
| Nacconol NRSF (about 90% sodium alkyl aryl sulfonate having an average of 12 carbon atoms in the alkyl chain, and about 10% sodium sulfate) | 0.1 |
| Fluorescent dye—Compound b | 0.1 |
| Water | 99.8 |
| Total | 100.0 |

The pH of the bath is adjusted to 3.0 with formic acid, and nylon cloth is immersed in the bath maintained at about 140° F., for 10 minutes. It is then thoroughly rinsed and dried. The treatment imparts to the nylon cloth very strong blue fluorescence under black light.

From the foregoing, it is apparent that the invention provides a new class of compounds having valuable properties, particularly as fluorescent dyes, and to a process for preparing such compounds readily.

While we have described particular embodiments of our invention for purposes of illustration, it should be understood that various modifications and adaptations thereof may be made within the spirit of the invention, as set forth in the appended claims.

We claim:
1. A compound having the formula:

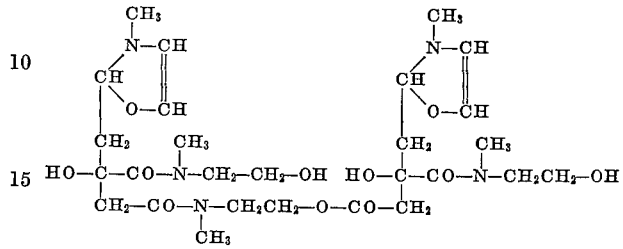

2. A compound having the formula:

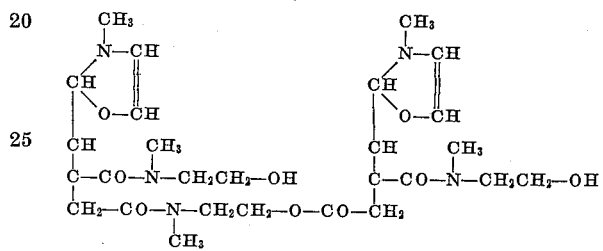

3. A compound having the formula:

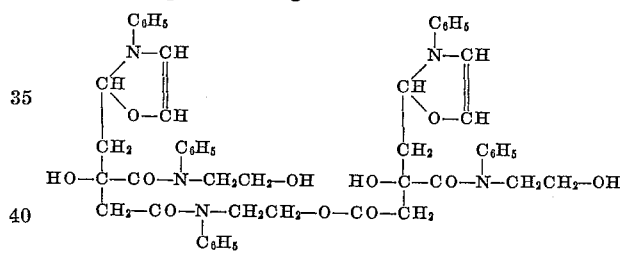

4. A compound having the formula:

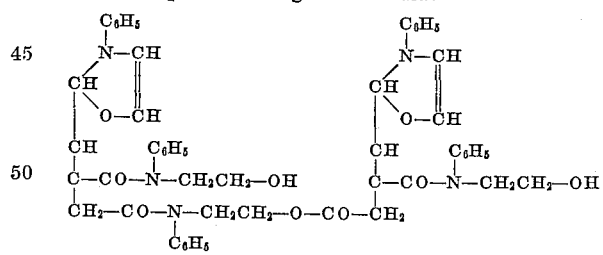

5. The process which comprises heating at temperatures between about 300° F. and 400° F. N-phenyl ethanolamine with a tricarboxylated compound of the group consisting of citric acid, aconitic acid, tricarballylic acid, and the esters thereof, in a molar ratio of at least 1 mol of the amine per mol of the tricarboxylated compound.

6. The process which comprises heating at temperatures between about 300° F. and 400° F. N-methyl ethanolamine with a tricarboxylated compound of the group consisting of citric acid, aconitic acid, tricarballylic acid, and the esters thereof, in a molar ratio of at least 1 mol of the amine per mol of the tricarboxylated compound.

7. The process which comprises heating at temperatures between about 300° F. and about 400° F. N-phenyl ethanolamine and citric acid in a molar ratio of the amine to the acid of from about 3:1 to about 4:1, continuing the reaction until frothing of the reaction mixture substantially ceases, removing excess phenyl ethanolamine from the reaction mixture, and recovering the reaction product.

8. The process which comprises heating at temperatures between about 300° F. and about 400° F. N-methyl ethanolamine and citric acid in a molar ratio of the amine to the acid of from about 3:1 to about 4:1, continuing the reaction until frothing of the reaction mixture substantially ceases, removing excess methyl ethanolamine from the reaction mixture, and recovering the reaction product.

9. A compound having the formula:

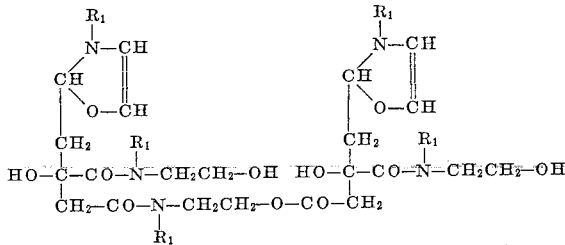

where $R_1$ is an alkyl group of from 1 to 12 carbon atoms.

10. A compound having the formula:

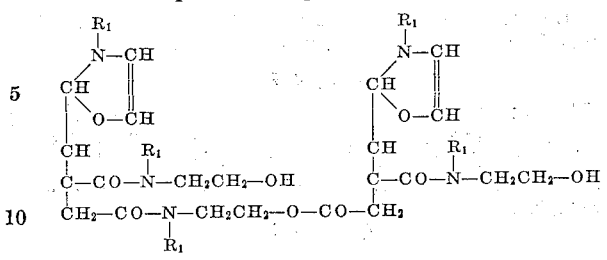

where $R_1$ is an alkyl group of from 1 to 12 carbon atoms.

References Cited by the Examiner

Fieser et al.: Advanced Organic Chemistry (New York, 1961), pages 640–674 and 904–928.

IRVING MARCUS, *Primary Examiner.*

NICHOLAS S. RIZZO, WALTER A. MODANCE,
*Examiners.*